United States Patent Office 3,302,546
Patented Feb. 7, 1967

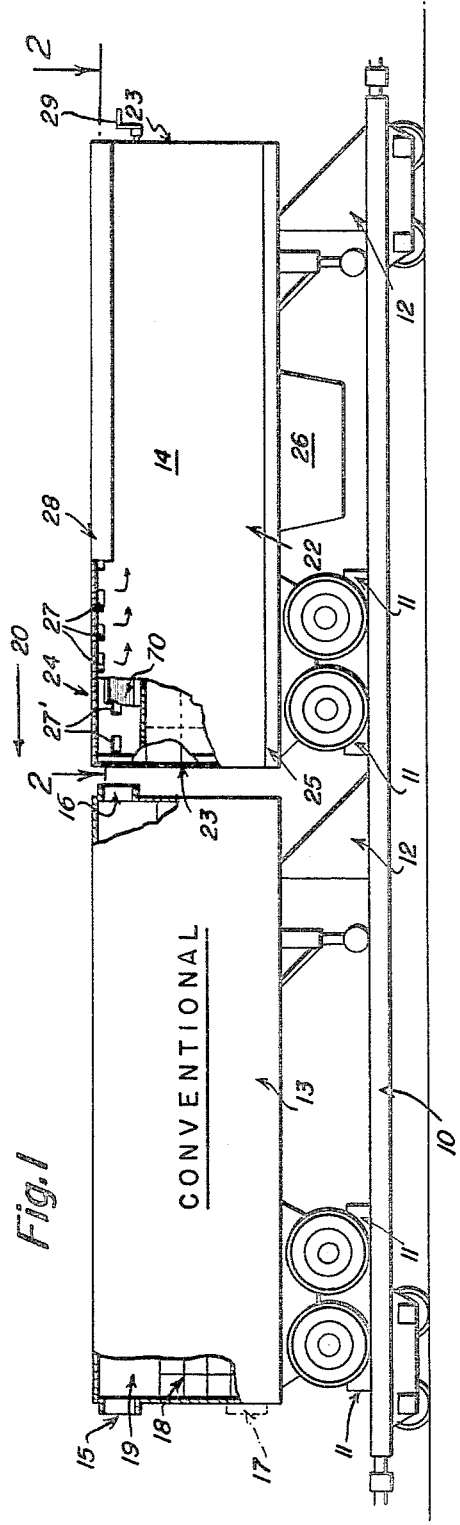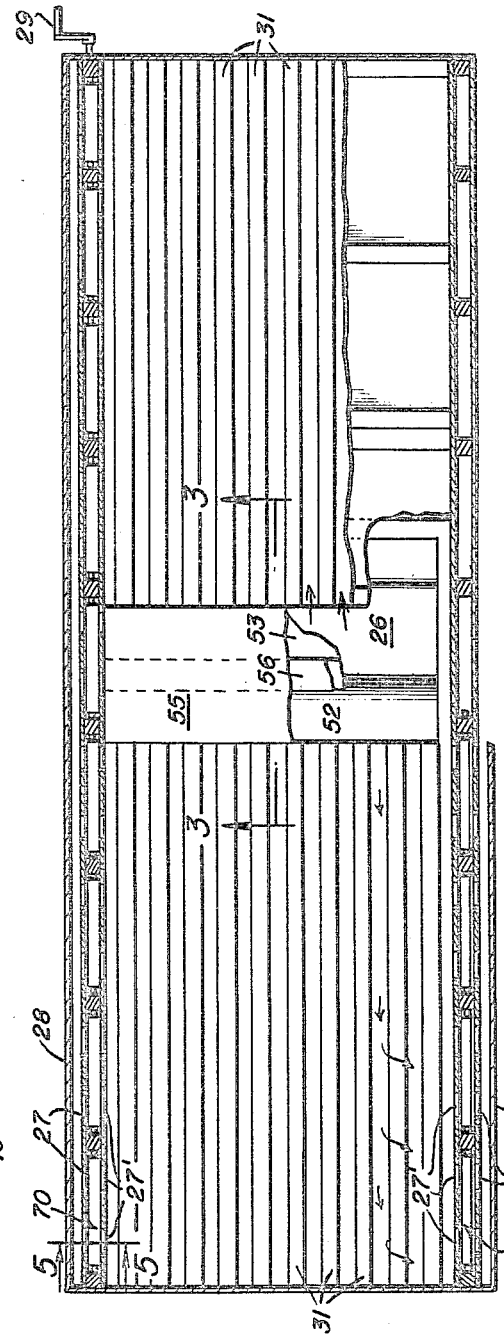

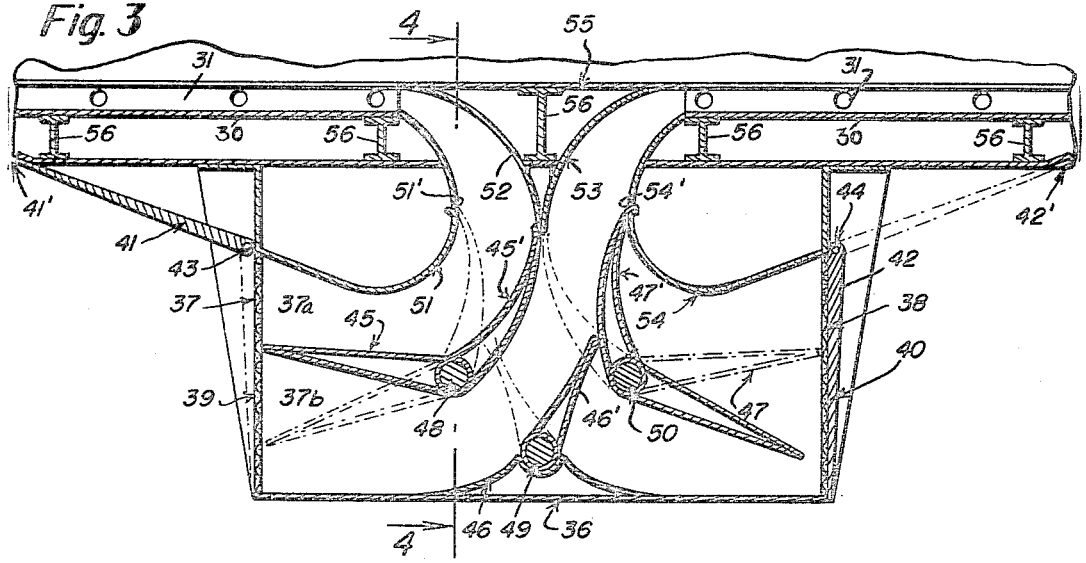
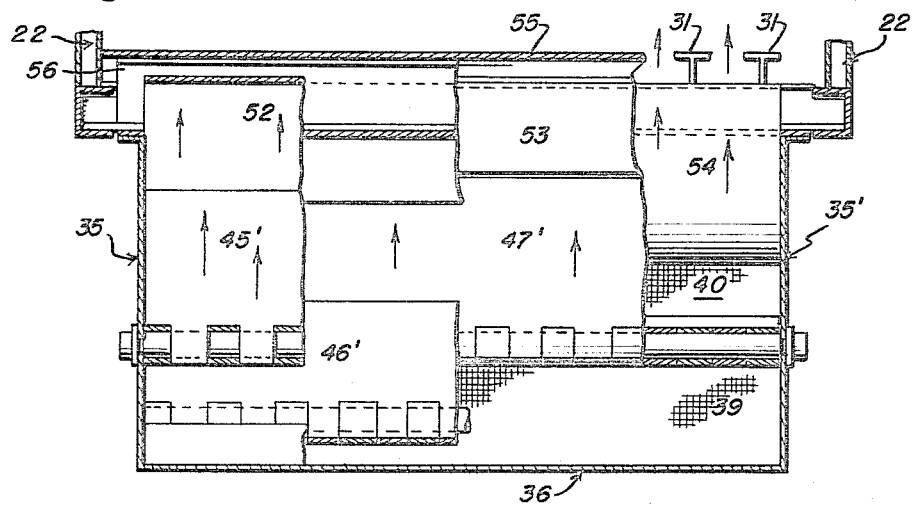
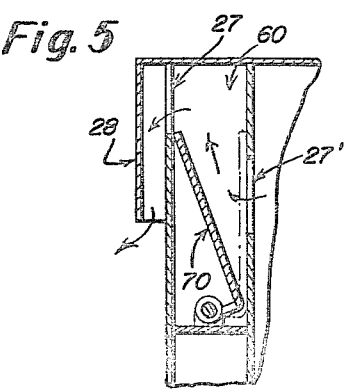
INVENTOR
Eric Rath
BY
ATTORNEY

3,302,546
VENTILATION SYSTEM FOR CARGO BODY
Eric Rath, Miami, Fla., assignor to Rath Company, Coral Gables, Fla., a corporation of Florida
Filed Dec. 4, 1964, Ser. No. 415,953
4 Claims. (Cl. 98—9)

This invention relates to ventilated, insulated highway transportation semi-trailers or dual purpose convertible container-trailers and more particularly to semi-trailers or container-trailers which are suitable for the transportation of perishable commodities, such as agricultural produce, via "trailer-on-flat-car," conveniently identified as "TOFC" service.

The cooling of produce in transit, without the aid of costly mechanical refrigeration units, has long been a major problem. There have been numerous attempts to design adequate ventilation means for insulated highway semi-trailer units which are utilized to transport produce. Ordinary trailers of this nature are equipped with vent doors on the front and rear, generally towards the top of the trailer body, to maintain a through-flow of cooling air. Unfortunately in most cases the air stream passes over the cargo without any appreciable cooling effect upon it. The problem of maintaining produce at an optimum temperature during storage and transportation is further compounded by the fact that the produce not only generates heat itself, but the exterior of the trailer absorbs heat from the sun and passes it on to the interior thus adding to the heat load.

The ordinary vent doors on the front and rear of the trailers are even less effective when the trailer is loaded upon a flatcar for transportation via railroad, due to the fact that the vent doors are frequently within an area of little or no relative air movement.

Therefore these so-called ventilated trailers known in the prior art are largely ineffectual in maintaining optimum temperature because the heat generated is only partly removed by the rising of the hot air toward the roof of the trailer, and only this air is removed from the trailer once it has reached the area above the load. The heat generated in the center of the load continues unchecked and consequently spoilage losses of fresh produce because of overheating are costly.

It is therefore an object of this invention to set forth the design of an apparatus which is suitable for the transportation of fresh produce and is superior in design to any trailers of similar utility heretofore known.

Another object of this invention is to provide a fresh produce trailer which is suitable for "TOFC" shipment on a railroad flatcar without the need for costly mechanical refrigeration.

Another object is to provide apparatus of the above character which operates effectively regardless of the direction of travel of the railroad car upon which it is transported.

Still another object of this invention is to provide a ventilation system for trailers in which fresh air is evenly supplied to all portions of the cargo area, including the central portion of the cargo.

A further object of this invention is to provide apparatus of the above character which requires little in the way of attendance or maintenance.

The invention accordingly consists of an improved means for effectively distributing fresh air to the entire loading space of a highway semi-trailer, or container-trailer during transportation over the highway or when loaded on a flatcar for transportation via railroad.

Other objects and advantages of this invention will be readily apparent from the following detailed description of the preferred embodiments of the invention shown in the accompanying drawings in which:

FIGURE 1 is a side elevation, partially broken away, of a conventional trailer and the trailer of the instant invention loaded upon a railroad flatcar;

FIGURE 2 is an enlarged horizontal longitudinal section partially broken away to show a portion of the trailer and underframe taken along line 2—2 of FIGURE 1;

FIGURE 3 is an enlarged vertical longitudinal section taken along line 3—3 of FIGURE 2;

FIGURE 4 is a vertical transverse section of the device of FIGURE 3 taken along line 4—4; and FIGURE 5 is an enlarged partial vertical section of the upper side wall and roof of the trailer embodying the present invention, taken along line 5—5 of FIGURE 2.

Referring now to the drawings in detail and to FIGURE 1 in particular, a railroad flatcar, generally indicated at 10 has anchored thereon by means generally indicated at 11 and 12 a highway semi-trailer of conventional design generally indicated at 13 and a semi-trailer 14 embodying the present invention. The conventional trailer 13 has an air intake opening 15 at the rear end and an air intake opening 16 at the front thereof. The vent doors or closures are not shown. Another vent indicated at 17 by broken lines indicates an alternative location for a vent opening and door. The side panel of the trailer 13 is partially broken away to expose the cargo 18 and the free space 19 above the cargo 18. The direction of movement of the train is shown by the arrow 20. It may therefore be seen that fresh air entering trailer 13 through vent opening 15 tends to pass over the cargo 18 through free space 19 and out of the trailer by way of vent opening 16 which frequently is in an area of little or no air movement. The cooling effect to the cargo is therefore minimal.

The trailer 14 embodying the present invention has the usual cargo space 21 enclosed by side walls 22 and 23, roof 24 and floor 25, the details of which will be described later. Mounted beneath the floor 25 of the trailer 14 is an air inlet housing 26 which will be described in detail later. Near the junction of the side walls 22 and roof 24 the trailer is provided with a plurality of air discharge ports 27 on the exterior of side wall 22 and a plurality of discharge ports 27' on the exterior of side wall 23 which extend along the entire length of the trailer side wall 22. A baffle member 28 forms an overhang to define a tortuous path for the air discharging to protect the discharge ports 27 from the entrance of rain, etc. The space between the lower edge of the baffle 28 and the side wall 22 may be screened. The baffle member has been partially broken away to show the placement of the discharge ports 27 which may be of any suitable configuration such as rectangular, square, round or oval, for example.

The discharge ports 27' may be closed when necessary, such as in cold weather, by means of a control member 29, and its associated damper element 70 (which is best seen in FIGURE 5), which will be described in detail later.

Referring now to FIGURES 3 and 4, it is seen that the fresh air inlet housing generally designated at 26 cooperates with the floor 25 which forms a plenum chamber extending under the entire trailer cargo. As will be seen in detail later, the area immediately above the inlet housing 26 is covered by a substantially flat load bearing plate. The floor 25 is comprised of an integral aluminum extrusion or the like 30 with a plurality of longitudinal upstanding T portions 31 which are transversely spaced so as to define a plenum for the distribution of the fresh air inletting through housing 26. The discharge ports 27 in the side walls 22 are longitudinally spaced adjacent to the top of the trailer and cooperate to define an outlet for the air which enters beneath the cargo, spreads out along the entire length and width of the trailer and then is discharged through ports 27. The discharge ports 27 may be closed by means of the damper element 70 which is pivotally hinged adjacent its lower end.

With regard to FIGURES 3 and 4, it is seen that the air inlet housing 26 comprises a housing having side walls 35 and 35', a bottom wall 36 with opposed air inlets 37 and 38 which are provided with a suitable insect screen 39 and 40 and covers 41 and 42 which are pivotally mounted at 43 and 44 and secured by means shown at 41' and 42'. Within the interior of the housing 26 are a plurality of fixed air directing vanes 45, 46 and 47. Pivotally journaled to fixed vanes 45, 46 and 47 by means of hinge pins are movable dampers 45', 46' and 47' which are fixed to their respective hinge pins 48, 49 and 50, respectively. The dampers are also journaled in suitable bearings which are supported by the air inlet side walls 35 and 35' and the ends of pins 48, 49 and 50 terminate in means for oscillating the dampers between the full line and phantom line positions for reasons which will become apparent. The upper walls 51, 52, 53 and 54, vanes 45, 46, 47 and dampers 45', 46', 47' of the housing 26 define a bifurcated plenum which directs the incoming air to the longitudinal plenum defined by the upstanding floor elements 31 and thence to substantially the entire underside of the cargo.

The elements 51 and 54 have transverse slots 51' and 54' to receive the free end of the dampers 45' and 47'. The damper elements 45', 46' and 47' and the covers 41 and 42 are shown in position when the train upon which the trailer is being transported is moving in the direction of the arrow 20.

The upper end of the bifurcated plenum defined by the elements 51, 52, 53 and 54 are considerably reduced in cross-sectional area in order to affect a compression of the incoming air with the effect that the velocity of the air is greatly increased thereby assuring effective ventilation of the cargo space.

When the train is moving in the opposite direction the dampers 45', 46', 47' and the covers 41 and 42 would be moved to the dotted positions shown in FIGURE 3 by means of levers (not shown) placed on the ends of pins 48, 49, 50 and hand manipulation of covers 41 and 42. The area above the bifurcated plenum members 51, 52, 53 and 54 is covered by a substantially flat metal plate 55 to prevent any restriction of the plenum by the cargo. The plate 55 as well as the floor 31 is supported by the trailer frame cross-members 56.

With regard to FIGURE 5, it may be seen that the side wall 22 of the trailer 14 is an insulated member with an interior and exterior skin of metal or the like. The accelerated air moving outwardly and upwardly through the cargo moves toward interior discharge ports 27' which like the exterior discharge ports 27 are longitudinally spaced along the upper interior side wall of the trailer. By a tortuous path, as shown by the arrows, the air is discharged through the external ports 27. The outward flow of the air is aided by two factors. The first factor is the increased velocity of the air as caused by the compressional effect of the bifurcated air inlet plenum, and the second factor is the venturi effect due to the stream of air rushing by the ports 27 as the railroad car moves forward. Mounted in the longitudinal void 60 between the inner and outer skin of the side wall 22 is the damper 70 which extends the entire length of the trailer. The damper 70 is pivotally mounted, adjacent its lower end, so that it may be oscillated by means of the control lever 29 (see FIGURE 1) to the dotted position in FIGURE 5 to effect the closing of the interior ports 27' thus substantially preventing the egress of air from within the trailer. The air discharge ports 27 shown in FIGURES 1, 2 and 5 extend through the exterior skin of the side wall 22 protected by an overhang 28.

In operation the trailer 14 loaded with a cargo of produce is placed upon the flatcar 10. The anticipated direction of movement of the train is shown by the arrow 20.

The air inlet covers are secured in the full line position shown in FIGURE 3 wherein the inlet cover facing the direction of travel is secured in an open position and the cover facing rearwardly is secured in a closed position. The damper elements 45', 46' and 47' are placed in the positions shown in full lines in FIGURE 3. The discharge port damper 70 is placed in the position shown in full lines in FIGURE 5. The forward motion of the train in the direction of the arrow 20 will force air into the inlet opening 37. The air will be substantially divided between plenums 37a and 37b. As the air is forced toward the upper portion of the bifurcated plenum, it will undergo a compression of approximately 5 to 1 ratio. This will thereby cause an increase in the velocity of the air. The high velocity air then moves longitudinally of the trailer through the floor plenum and upwardly through the cargo where it cools the cargo by both conduction and evaporative cooling effects. The heated air then rises up through substantially the entire cargo toward the plurality of discharge ports 27 and 27' which extend along the entire upper length of both sides of the trailer. This air flow through the trailer is aided by the partial vacuum created by the venturi action at ports 27 of the forward motion of the train.

In a trailer of the instant design, it is possible to have approximately 8,000 cubic feet of air per minute enter the trailer when the train is moving at 50 miles per hour. When the train is standing still, the temperature differential between the hot and cool side of the trailer aids in the intaking of air through 37 and discharging through ports 27 and 27'.

In the event cold temperatures are encountered the covers 41 and 42 are closed and the discharge port damper is moved into the dotted position shown in FIGURE 5.

While a preferred embodiment of my invention has been shown for illustrative purposes, it is to be understood that the structure herein described could be modified without departing from the true spirit of the invention.

What is claimed as new is as follows:

1. In a ventilation system for a vehicular cargo body having a floor, vertical walls and a roof, the combination comprising air intake means, said air intake means being supported below said floor and including means for introducing air regardless of the direction of travel of said vehicular cargo body, air-distribution means cooperating with said air intake means, said air-distribution means being integral with said floor for distributing air to substantially the entire upper surface of said floor, and an air discharge means for the air rising up from said air-distributing means comprising a plurality of discharge ports positioned in an upper portion of said cargo body, the air distribution means comprises a plurality of transversely spaced, longitudinally arranged, air distribution plenums, said plenums comprising a substantially flat floor member having integral upstanding T-shaped members running longitudianlly of said floor members.

2. In a ventilation system for a vehicular cargo body having a floor, vertical walls and a roof, the combination comprising air intake means, said air intake means being supported below said floor and including means for introducing air regardless of the direction of travel of said vehicular cargo body, air-distribution means cooperating with said air intake means, said air-distribution means being integral with said floor for distributing air to substantially the entire upper surface of said floor, and an air discharge means for the air rising up from said air-distributing means comprising a plurality of discharge ports positioned in an upper portion of said cargo body, the air discharge means further comprises a plurality of discharge ports on the upper portion of the interior of said vertical walls, said vertical walls comprising spaced interior and exterior skin portions defining a cavity, a damper element disposed in said cavity, means connected to said damper element for selectively operating to open or close said interior discharge ports, exterior discharge ports positioned in the exterior skin of said side wall to permit the discharge of air from the interior to the exterior of said cargo body, and an overhang integral with said cargo body, said overhang defining a downwardly opening tortuous path for the discharge of air from said discharge ports while protecting said ports from the ingress of rain.

3. In a ventilation system for a vehicular cargo body having a floor, vertical walls and a roof, the combination comprising air intake means, said air intake means being supported below said floor and including means for introducing air regardless of the direction of travel of said vehicular cargo body, air-distribution means cooperating with said air intake means, said air-distribution means being integral with said floor for distributing air to substantially the entire upper surface of said floor, and an air discharge means for the air rising up from said air-distributing means comprising a plurality of discharge ports positioned in an upper portion of said cargo body, the air intake means further comprising an air intake housing mounted adjacent said opening for selectively controlling said opening, and a plurality of internal air directing vanes and damper means, said plurality of vanes and damper means cooperating to define a bifurcated plenum, one plenum of said bifurcated plenum being positioned to deliver air to one-half of the interior of said cargo body and the second said plenum being positioned to deliver air to the second half of the interior of said cargo body, said plurality of damper means being selectively positionable to cooperate with either of said air intake means, said damper means being automatically responsive and oriented according to the relative direction of travel of the air intake housing as the vehicle is moved.

4. In a ventilation system for a vehicular cargo body having a floor, vertical walls and a roof, the combination comprising air intake means, said air intake means being supported below said floor and including means for introducing air regardless of the direction of travel of said vehicular cargo body, air-distribution means cooperating with said air intake means, said air-distribution means being integral with said floor for distributing air to substantially the entire upper surface of said floor, and an air discharge means for the air rising up from said air-distributing means comprising a plurality of discharge ports positioned in an upper portion of said cargo body, the air intake means further comprising means for compressing the incoming air to increase the velocity of said air, said last mentioned means comprising a bifurcated plenum, said bifurcated plenum having a decreasing cross-sectional area wherein said inlet end of said plenum is of substantially greater cross-sectional area than the discharge end of said plenum.

References Cited by the Examiner
UNITED STATES PATENTS

| | | | |
|---|---|---|---|
| 13,732 | 10/1855 | Taylor | 98—20 |
| 156,605 | 11/1874 | Sterne | 98—20 |
| 1,065,420 | 6/1913 | Wolkarte | 98—8 |

MEYER PERLIN, *Primary Examiner.*